Figure 1:
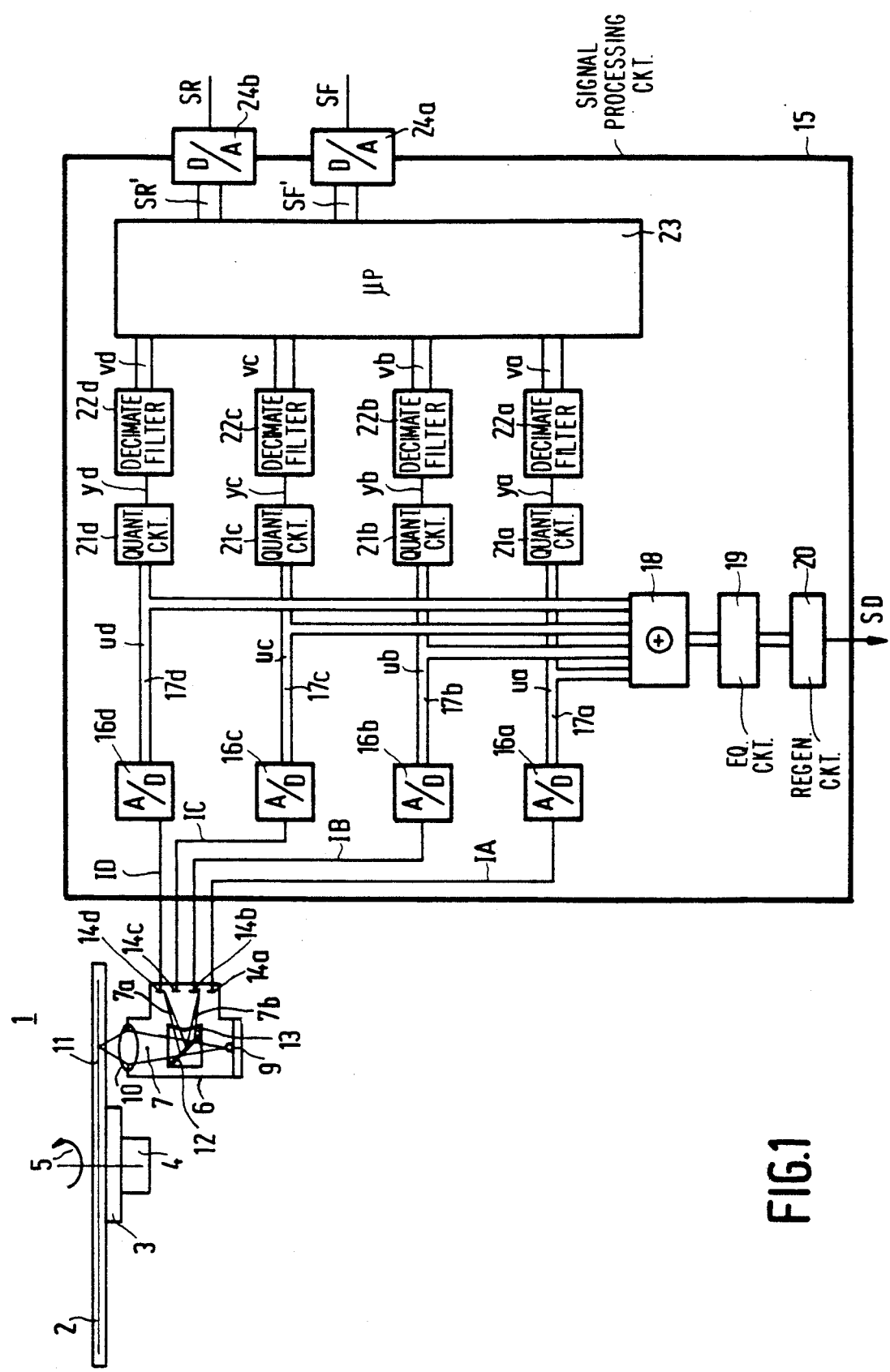

United States Patent [19]

Groen

[11] Patent Number: 5,170,387
[45] Date of Patent: Dec. 8, 1992

[54] APPARATUS FOR READING AN INFORMATION PATTERN FROM A RECORD CARRIER AND SIGNAL-PROCESSING CIRCUIT FOR USE IN SUCH APPARATUS

[75] Inventor: Robertus W. C. Groen, Eindhoven, Netherlands

[73] Assignee: U.S. Philips Corporation, New York, N.Y.

[21] Appl. No.: 419,979

[22] Filed: Oct. 11, 1989

[30] Foreign Application Priority Data

May 8, 1989 [NL] Netherlands ......................... 8901142

[51] Int. Cl.⁵ ......................... H04N 5/76; G11B 5/09; H03M 7/00; H04B 14/06
[52] U.S. Cl. ......................... 369/59; 360/32; 360/48; 307/543; 307/260; 341/95; 341/200; 341/61; 375/28
[58] Field of Search ......................... 369/59; 360/39, 40, 360/48, 32; 341/75, 77, 95, 102, 200; 307/529, 556, 268, 271

[56] References Cited
U.S. PATENT DOCUMENTS

| | | | |
|---|---|---|---|
| 4,509,037 | 4/1985 | Harris | 375/28 |
| 4,520,346 | 5/1985 | Shimada | 360/40 |
| 4,613,908 | 9/1986 | Takahashi et al. | 360/48 |
| 4,633,330 | 12/1986 | Yamamitsu et al. | 360/32 |
| 4,855,742 | 8/1989 | Verboom | 341/102 |
| 4,859,883 | 8/1989 | Bradinal | 307/529 |
| 4,866,691 | 9/1989 | Yokogawa | 369/59 |
| 4,896,311 | 1/1990 | Ishihara | 369/59 |
| 4,930,115 | 5/1990 | Verboom et al. | 369/59 |
| 4,972,401 | 11/1990 | Carasso et al. | 369/59 |
| 4,972,436 | 11/1990 | Halim et al. | 375/28 |

Primary Examiner—Aristotelis Psitos
Assistant Examiner—Jefferson Evans
Attorney, Agent, or Firm—Leroy Eason

[57] ABSTRACT

An information track on a record carrier (2) is read by a read head which includes detectors producing detection signals (IA, IB, IC and ID) which correspond to the information pattern on the track. The respective detection signals are converted by analog-to-digital converters (16a, 16b, 16c and 16d) into respective series of n-bit digital signal values (ua, ub, uc and ud). From such signal values a data signal (SD) is derived which is representative of the information being read. The signal values are also applied to respective cascade arrangements of a quantizing circuit (21a, 21b, 21c and 21d) and a decimating filter (22a, 22b, 22c and 22d), which convert them into respective series of signal values (va, vb, vc and vd) which represent only the low frequency portion of the information in the detection signals produced by the read head and include control information relating to tracking by the read head. Those series of signal values are supplied to a microprocessor which derives therefrom control signals (Sr, Sf) for controlling the read head to maintain accurate tracking.

7 Claims, 5 Drawing Sheets

APPARATUS FOR READING AN INFORMATION PATTERN FROM A RECORD CARRIER AND SIGNAL-PROCESSING CIRCUIT FOR USE IN SUCH APPARATUS

The invention relates to an apparatus for reading an information pattern from a record carrier, which apparatus comprises a read head for scanning the information pattern, which read head comprises detectors for generating detection signals in depedence upon the information pattern being scanned, the apparatus further comprising a signal processing circuit for processing the detection signals, which circuit comprises at least one analog-to-digital converter for converting the detection signals into series of n-bit signal values of a specific repetition frequency, n being an integer greater than 1.

The invention further relates to a signal-processing circuit for use in such an apparatus.

Such an apparatus and signal-processing circuit are known from European Patent Application EP-A 0,138,273 (PHN 10.804). The apparatus described therein is an optical read apparatus for reading an optically detectable information pattern in the form of a structure of pits. A data signal representing the information pattern being scanned is derived from the series of signal samples obtained by means of the analog-to-digital converter. Moreover, said series of signal values are employed for deriving control signals for controlling the scanning process, such as for example a tracking-error signal and a focus-error signal. In order to generate these control signals the low frequency information is extracted from the series of signal values supplied by the analog-to-digital converter. The drawback of the known device is that this requires much hardware. This is a drawback, in particular if the signal-processing circuit is to be incorporated in an integrated circuit, comprising both the circuits for deriving the control signals and the circuits for deriving the data signal, because the semiconductor area available for the circuits is limited.

It is an object of the invention to provide an apparatus and a signal-processing circuit requiring less hardware. According to the invention an apparatus of the type defined in the opening paragraph is characterized in that characterized in that the signal-processing circuit comprises at least one quantising circuit for converting the series of n-bit signal values into series of m-bit signal values, m being smaller than n, the quantising circuit comprising a quantisation-noise redistribution filter for concentrating the spectral components of the quantisation noise produced during quantisation in the high frequency part of the quantisation-noise spectrum, the signal-processing circuit further comprising at least one decimating filter for converting the series of m-bit signal values into series of p-bit signal values, P being an integer larger than n, and the repetition frequency of the p-bit signal values being lower than that of the m-bit signal values.

By combining the quantising circuit and the decimating filter it is achieved that the series of p-bit signal values obtained by means of the quantising circuit and the decimating filter only represent the low-frequency components of the detection signals. By the use of the quantising circuit it is achieved that the number of bits of the signal values applied to the decimating filter is small, so that the decimating filter can be realised with a minimum of hardware. The use of the quantisation-noise redistribution filter in the quantising circuit ensures that the quantisation noise contains mainly spectral components in a part of the frequency spectrum which is situated outside the low-frequency part which is relevant to the control system. This means that despite the quantisation a very satisfactory signal-to-noise ratio is obtained in the series of signal values supplied by the decimating filter.

An embodiment of the read apparatus is characterized in that the analog-to-digital converter comprises a sigma-delta modulator. This embodiment has the advantage that the analog-to-digital converter can also be realised with a minimum of hardware. Moreover, the phase shift produced by the analog-to-digital converter comprising a sigma-delta modulator is smaller than for other types of analog-to-digital converters for the same signal-to-noise ratio. This is of particular advantage when the scanning process is controlled in response to signals obtained via the analog-to-digital converter, because this requires a minimal phase shift for reasons of stability.

A further embodiment of the read device is characterized in that m is 1. This embodiment has the advantage that very simple decimating filters can be employed, such as for example a filter of the "integrate and dump" type.

A further embodiment of the read apparatus is characterized in that the quantising circuit is adapted to generate the series of m bit signal values of a sample repetition frequency smaller than the repetition frequency for the series of n-bit signal values, the repetition frequency of the m bit signal values being situated between two time and one times the bandwidth of the detection signals. The reduction of the repetition frequency of the m-bit signal values is beneficial for a compact construction of the circuit. By reducing the repetition frequency these series no longer comply with the Nyquist sampling criterion. However, since exclusively the low-frequency part of the spectrum is used for deriving the control signals this will have no adverse effect. This is because the spurious components thus introduced are not situated in the low-frequency part of the spectrum.

The use of sigma-delta modulators as analog-to-digital converters is of particular advantage in optical read systems because in such systems, on account of the limited resolution of the optical system, signal components of a frequency above a frequency dictated by the MTF characteristic of this optical system do not occur at all. In the case of a high repetition frequency, as is customary in sigma-delta modulators, this means that it is no longer necessary to arrange an antialiasing filter between the detectors and the sigma-delta modulator.

If the information pattern represents an EFM modulated signal in accordance with the CD standard it is advantageous to select a multiple of the sample repetition frequency (44.1 kHz) as prescribed by the CD standard as the repetition frequency for analog-to-digital conversion. This has the advantage that both frequencies can be derived simply from a common frequency source.

Figure 2:
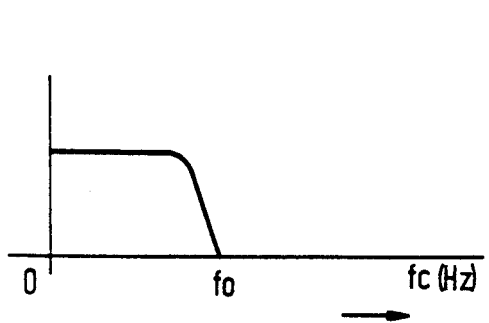
Figure 4:
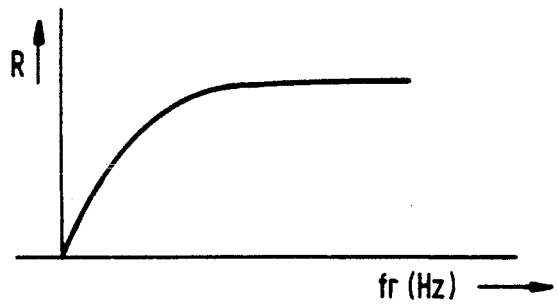
Figure 5:
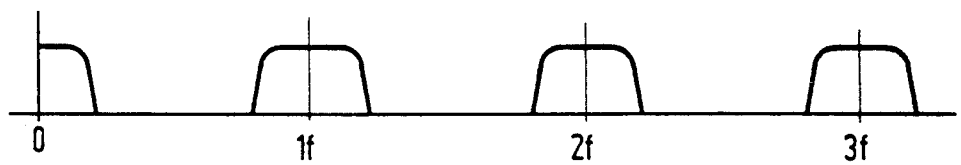
Figure 6:
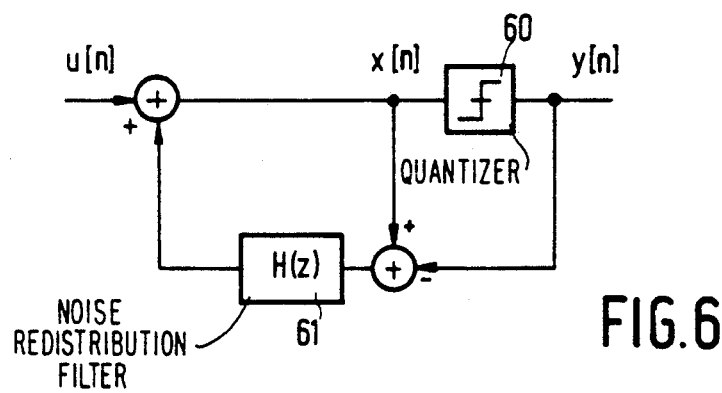
Figure 7:
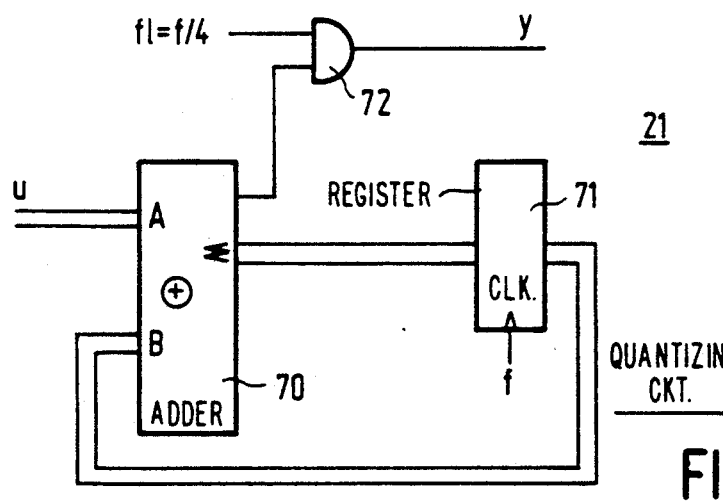
Figure 3:
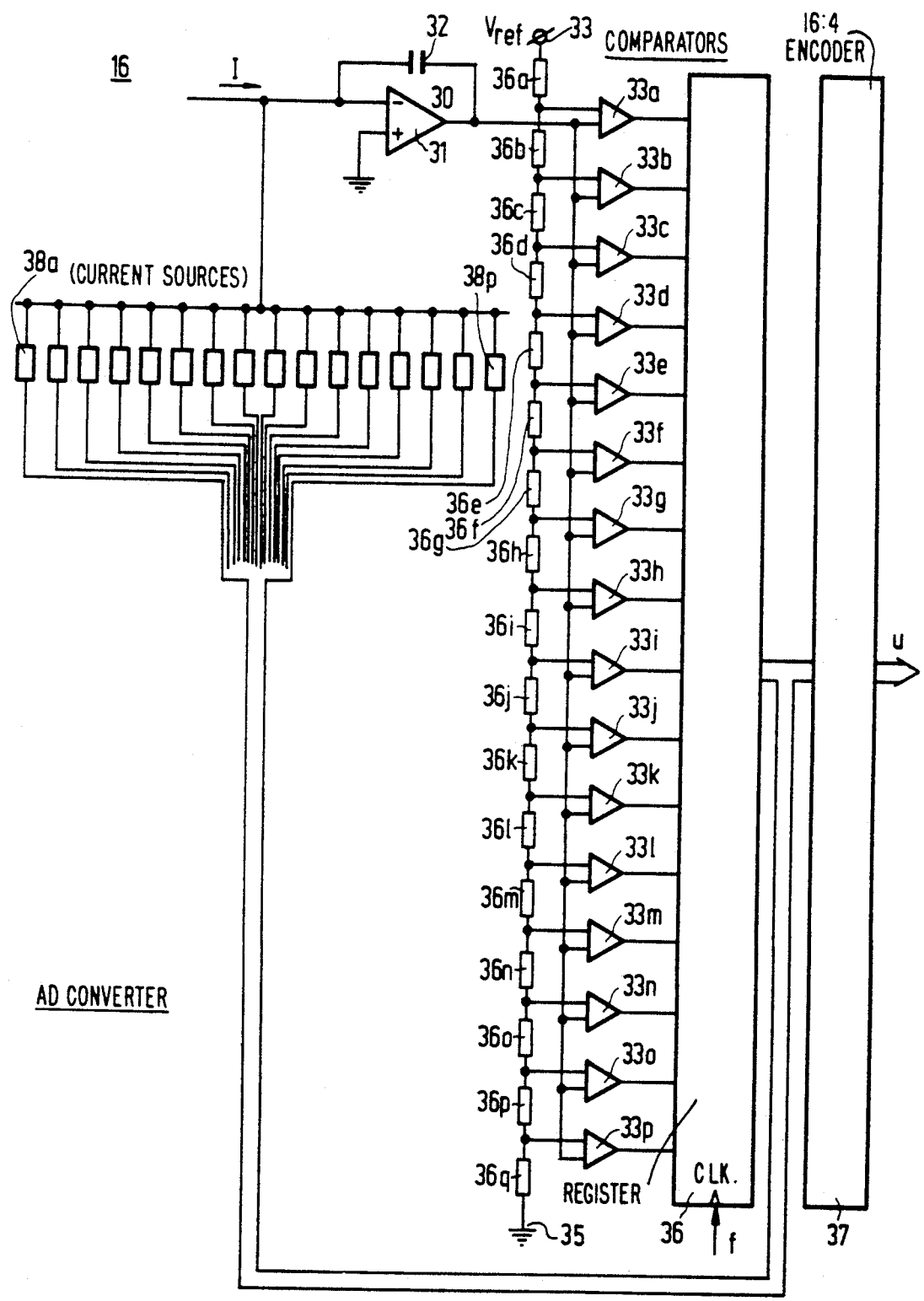
Figure 8:
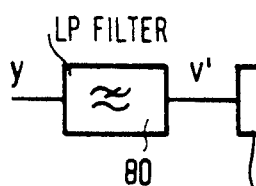
Figure 9:
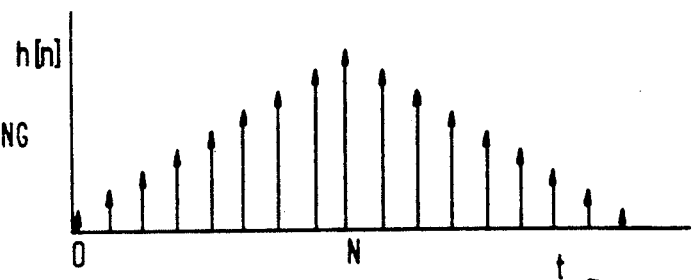
Figure 10:
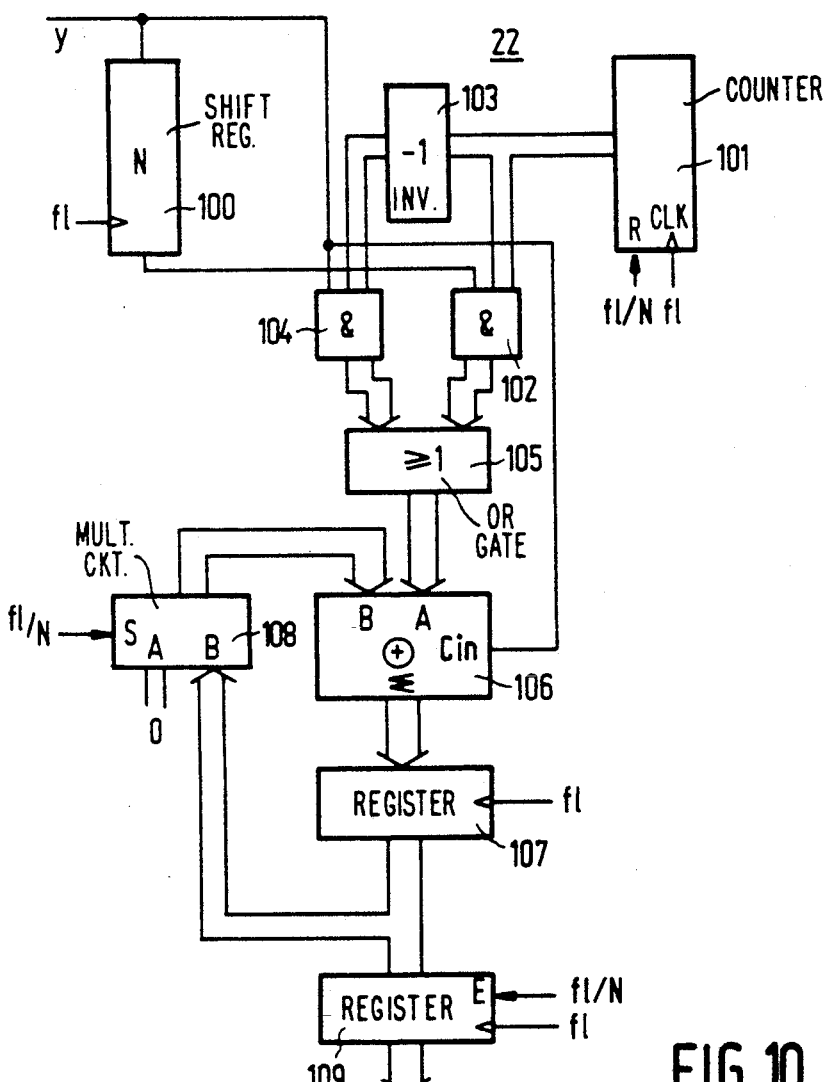
Figure 11:
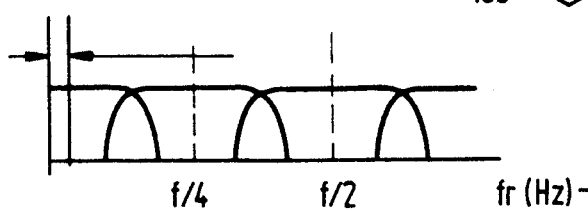
Figures 12, 13:
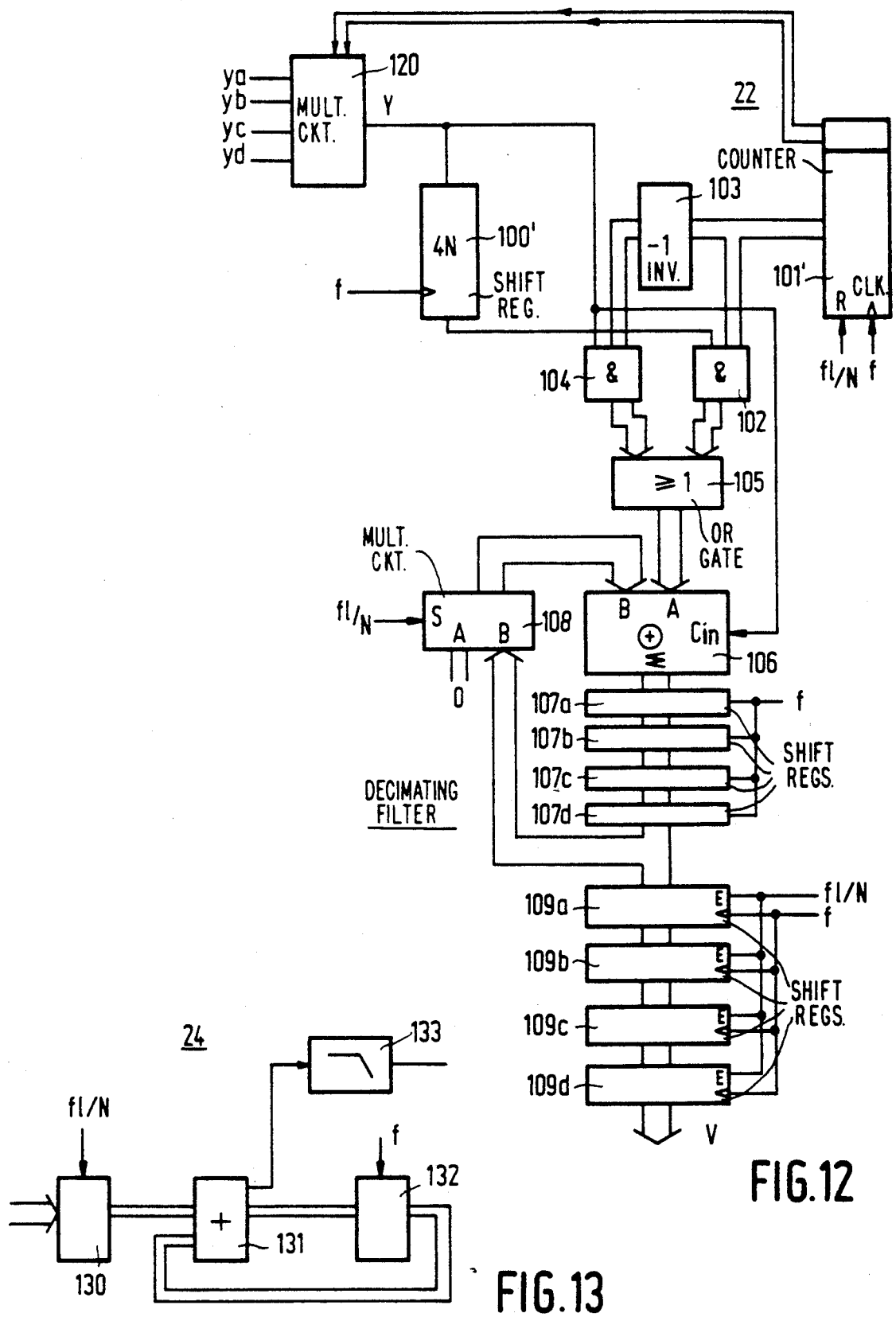

The invention will now be described in more detail, by way of example, with reference to FIGS. 1 to 13, in which FIG. 1 shows an embodiment of a read apparatus in accordance with the invention, FIGS. 2, 4, 5 and 11 show frequency spectra of a number of signals appearing in the apparatus, FIG. 3 shows an example of an analog-to-digital converter for use in the apparatus, FIG. 6 is a general block diagram of a quantising circuit for use in the read apparatus, FIG. 7 shows a practical example of the quantising circuit, FIG. 8 is a general block diagram of a decimating filter for use in the read apparatus, FIG. 9 shows the impulse response of a low-pass filter forming part of the decimating filter, FIGS. 10 and 12 show practical examples of the decimating filter, FIG. 13 shows an example of a digital-to-analog converter for use in the read apparatus.

FIG. 1 shows an embodiment of a read apparatus 1 in accordance with the invention. The reference numeral 2 refers to a disc shaped record carrier comprising a recording layer 11. The recording layer 11 exhibits an optically detectable information pattern, for example in the form of a track of optically detectable marks. The record carrier 2 may comprise, for example, a Compact Disc on which a digitised audio signal is recorded by means of a pattern of pits. The record carrier 2 is rotated about an axis 5 by means of a turntable 3 and a motor 4. An optical read head 6 of a customary type is arranged opposite the rotating record carrier 2 to scan the information pattern on the recording layer 11 by means of a radiation beam 7. For this purpose the read head 6 comprises a radiation source, for example a solid-state laser 9, to generate the radiation beam 7. The beam 7 is aimed at the recording layer 11 by means of a focusing objective 10. The radiation beam reflected from the record carrier 11 is then modulated in conformity with the information pattern. The radiation beam thus modulated is directed towards an array of four radiation-sensitive detectors 14a, 14b, 14c and 14d by a semitransparent mirror 12 and a beam splitter 13, for example a roof prism, which splits the beam into two separate sub-beams 7a and 7b. The detectors 14a, 14b, 14c and 14d then generate signal currents IA, IB, IC and ID which are substantially proportional to the amounts of radiation received by the relevant detectors. The signal currents IA, IB, IC and ID are applied to a signal-processing circuit 15, which derives from these currents a data signal SD, representing the information being read, and a plurality of control signals for controlling the scanning process such as a control signal SR for a beam-deflection actuator, to keep the radiation beam 7 on the track, and a control signal SF for a focus actuator, to keep the beam 11 in focus on the recording layer 11. The control signals SR and SF are derived from the low-frequency signal components in the signal currents and the data signal SD is derived from the remainder of the spectrum.

FIG. 2 gives the frequency spectrum of the signal currents IA, . . . , ID. It is to be noted that above a frequency fo dictated by the MTF characteristic of the optical system the spectrum no longer contains any frequency components. For the system used in conjunction with Compact Discs fo is of the order of magnitude of 1.6 MHz.

As is illustrated in FIG. 1, the signal currents IA, IB, IC, ID are applied to analog-to-digital converters 16a, 16b, 16c and 16d respectively, which convert the signal currents into series of n-bit signal values ua, ub, uc, ud having a repetition frequency f. The signal values ua, ub, uc and ud thus obtained are applied to an adder circuit 18 via data buses 17a, 17b, 17c and 17d. The output of the adder circuit 18 is applied to a data-signal regeneration circuit 20 via an equalising circuit 19 of a customary type, which regeneration circuit derives the data signal SD from the signal values applied to it. The circuit 20 falls beyond the scope of the present invention and is therefore not described in more detail. For a detailed description reference is made to Netherlands Patent Application no. 8801254 (PHN 12.553).

As already stated, the control signals SR and SF can be derived from the low-frequency components of the detection signals IA, . . . ID. However, in addition to said low-frequency components, the series of signal values ua, ub, uc and ud supplied by the analog-to-digital converters 16 also comprise high-frequency components containing information which is not useful for deriving the control signals SR and SF.

By means of quantising circuits 21a, 21b, 21c and 21d and decimating filters 22a, 22b, 22c and 22d the series of n-bit signal values ua, ub, uc and ud on the outputs of the analog-to-digital converters are converted into series of p-bit signal values va, vb, vc and vd having a lower sample repetition frequency f1/N, which merely represent the low-frequency information of the signal currents IA, IB, IC and ID. The signal values of low repetition frequency thus obtained are applied to a computing circuit 23, which in a customary manner processes the signal values to obtain SR' and SF' having a repetition frequency f1. The series SR' and SF' are converted into analog control signals SR and SF by means of digital-to-analog converters 24a and 24b.

Preferably, the signal processing circuit 15 is incorporated in a single integrated circuit, if possible together with the other digital circuits for processing the data signal SD. However, in that case it is desirable that the semiconductor area occupied by the signal-processing circuit 15 is minimal.

The analog-to-digital converters 16, the noise redistribution circuits 21, the decimating filters 22, and the digital-to-analog converters 24 should therefore be realised with a minimum of hardware.

Examples of analog-to-digital converters 16, noise redistribution circuits 21, decimating filters 22, and digital-to-analog converters 16 which can be realised by means of a minimum of hardware will be described hereinafter.

FIG. 3 shows an example of one of the analog-to-digital converters 16 constructed as a sigma-delta modulator. The input signal, for example one of the signal streams IA, IB, IC or ID, is referenced I. This signal I is applied to a filter 30 having a low-pass characteristic, for example an integrator, which in a customary manner may comprise an operational amplifier 31 and a capacitor 32. The output of the filter 30 is fed to the non-inverting inputs of each of a plurality of comparators 33a, . . . 33p. A series arrangement of resistors 36a, . . . 36q having equal resistance values is connected between a terminal 33 at a reference potential Vref and a terminal 34 at zero potential. The nodes between the resistors 36 are connected to the inverting inputs of the comparators 33. The output signals of the sixteen comparators 33 can represent sixteen different signal levels. The outputs of the comparators 33 are coupled to a clocked parallel-in parallel-out register 36, which in response to every pulse of a clock signal of a frequency f is loaded with the output signals of the comparators 33. The outputs of the register 36 are connected to a 16-to-4 encoding circuit 37, which converts the signal values represented by the outputs of the register 36 into a 4-bit code. The outputs of the register 36 are each connected to a control input of current sources 38a, ..., 38p. The current sources 38 are of a type which in response to a control signal of given signal level generates a current of predetermined value. The currents supplied by the current sources 33 are added to the signal current I on the input of the low-pass filter 30.

The circuit shown in FIG. 3 is a sigma-delta modulator used as an analog-to-digital converter. This type of digital-to-analog converter has the property that the spectral components of the quantisation noise R are mainly concentrated in the high-frequency part of the noise spectrum, as is illustrated in FIG. 4. If the repetition frequency of the 4-bit signal values u generated on the output of the 16-to-4 encoding circuit 37 by said analog-to-digital converter, which frequency is dictated by the clock signal, is substantially higher than that of the spectrum of the analog signal to be converted, the quantisation noise will be situated substantially outside the signal spectrum.

If the signal spectrum has a width of 1.6 MHz, as is customary in reading CD signals, a repetition frequency of approximately 8.5 MHz is very suitable. Preferably, this frequency is selected to be an integral multiple of the sample repetition frequency of 44.1 kHz as prescribed by the CD standard. In that case both frequencies can be derived from a common frequency source.

FIG. 5 shows the associated frequency spectrum of the series of signal values on the output of the analog-to-digital converter 16.

It is to be noted that the sigma-delta modulator shown in FIG. 3 is only one of the possible versions as described in, for example, U.S. Pat. No. 4,775,851.

FIG. 6 shows a general block diagram of the quantising circuit 21, which comprises a quantiser 60 and a noise-redistribution filter 61. The series of signal samples on the input is referenced u[n], while the series of signal samples on the output is referenced y[n]. The series of signal values x[n] obtained by adding u[n] and the series of signal samples on the output of the filter 61 is applied to the quantiser 60. The output signal of the quantiser 60 functions as the output signal y[n]. A series of signal samples composed of the difference between the signal samples x[n] and y[n] is applied to the input of the filter 61.

The z-transform Y(z) of the signal samples y[n] may be expressed as follows in the z-transform U(z) of the signal samples u[n] and the z-transform of the noise R(z) caused by quantisation $$Y(z) = \frac{c \cdot U(z)}{1 - H(z)(1 - c)} + \frac{(1 - H(z))R(z)}{1 - H(z)(1 - c)}$$

where H(z) is the transfer function of the filter 61 and where c is the gain factor of the quantiser 60. If the filter H(z) has a low-pass characteristic H(z) will be substantially equal to 1 for low frequencies. This yields $$Y[z] = U[z] + \frac{1 - H(z)}{c} R(z)$$

This shows that the noise component in y[n] is very small for low frequencies.

FIG. 7 shows an attractive practical example of the quantising circuit 21, comprising an adder circuit 70, a clocked parallel-in parallel-out register 71 and a two-input AND gate 72. The adder circuit 70 is a 6-bit adder. The 6-bit signal values on the output of the adder 70 are applied to the parallel-in parallel-out register 71, which is clocked by a clock signal of the frequency f. The outputs of the register 71 are fed to inputs B of the adder 70, while the 4-bit output signal of the analog-to-digital converter 16 is applied to the inputs A of the adder 70. An overflow signal, which is generated by the adder circuit 70 if the result of the addition is larger than the maximum value which can be represented by the 6 bits, is applied to an input of the AND gate, a clock signal of a frequency fl equal to f/4 being applied to the other input of the AND gate.

Thus, by means of the quantising circuit shown in FIG. 7 the series of 4-bit signal values u of a repetition frequency f is converted into a series of 1-bit signal values y of a frequency f/4. The adder 70 together with the register 71 constitutes a noise-redistribution filter having a low-pass characteristic, so that the low-frequency noise caused in the 1-bit signal samples by quantisation is minimal. By reducing the repetition frequency the various subspectra of the signal samples will partly overlap one another (see FIG. 11), which results in an additional disturbance of the high-frequency information in the 1-bit signal. However, since for deriving the control signals SR and SF only the low-frequency information is relevant, this additional disturbance does not present any problem. As will be apparent from the foregoing the quantising circuit 21 hardly leads to an increase of the noise component for the low-frequency information. The output signal of the quantising circuit is applied to the decimating filter 22, which extracts exclusively the low-frequency information from the output signal of the quantising circuit 21. FIG. 8 shows a general block diagram of a decimating filter, which in general comprises a low-pass filter 80 and a down-sampling circuit 81.

FIG. 9 shows an impulse-response characteristic h[n] of a second-order low-pass filter of simple construction. The relationship between the input signal y[n] and the output signal v'[n] for a filter with such a pulse signal may be written as follows $$V[n] = \sum_{i=0}^{N-1} (i + 1)(y[n - i]) + \sum_{i=0}^{N-1} (n - 1 - i)y[n - i - N]$$

Assuming that the down-sampling circuit reduces the repetition frequency by a factor N the low-pass filter should supply one output signal value for every N input signal values. The first term of the relationship between v'[n] and x[n] given above can be obtained by successively multiplying the N consecutive signal values y[n-i] by the coefficients (i+1) and adding the multiplication results to each other. The second term of this relationship can be obtained by delaying the incoming signal values y[n] by N clock pulses and multiplying the delayed signal values y[n-i-N] by the coefficients (N-1-i) and adding the multiplication results to each other.

The delay by N clock pulses enables two subproducts to be determined simultaneously. It is to be noted that the values of the coefficients (i+1) are the complements of the coefficients (N-1-i) plus 1, so that the coefficients can be derived simply from each other.

FIG. 10 shows an example of the decimating filter 22 utilising these properties. The decimating filter shown is of the "integrate and dump" type, which is described for example in the article by Candy: "Decimation for sigma-delta modulation" in IEEE Trans. on Comm. 1, Vol. COM 34, pp.72-76, January 1986.

The 1-bit input signal y of the decimating filter in FIG. 10 is delayed by N clock pulses by means of an N-bit shift register 100, which is clocked by a signal of the frequency f1. The filter further comprises a counter 101 having a counting range N for the generation of the coefficients (N-i-1). The counter 201 counts the pulses of the clock signal having the frequency f1. Moreover, the counter 101 comprises a reset input for resetting the counter to zero. A reset pulse of a frequency f1/N is applied to the reset input. The count of the counter is applied to an AND gate circuit 102. The complement of the count is generated by means of an inverter circuit 103. The complement of the count is applied to an AND gate circuit 104.

The 1-bit signal samples y are also applied to the AND gate circuit 104. The AND gate circuit 104 is constructed in such a way that the complement of the count is transferred or not transferred to the outputs of the AND gate circuit 104 depending on the logic value of the signal sample y.

The signal samples y on the output of the shift register 100, which samples have been delayed by N clock pulses, are applied to the AND gate circuit 102, which transfers the count to its outputs depending on the logic value of the received signal sample. The outputs of the AND gate circuits are connected to an OR gate circuit 105, which functions as an adder circuit because the signals applied to it are each other's complements. The result on the output of the OR gate circuit 105 is applied to an adder circuit 106. The outputs of the adder circuit 106 are coupled to inputs B of the adder circuit 106 via a clocked parallel-in parallel-out register 107 and a multiplex circuit 108. The register 107 is controlled by a signal of the frequency f1. The multiplex circuit 108 has two sets of parallel inputs A and B, the inputs B being connected to the outputs of the register 107 and the signal value 0 being applied to the inputs A. The multiplex circuit 108 is clocked by a signal of a frequency f1/N such that the signal value 0 is applied to the inputs B of the adder circuit 106 after every N clock pulses of the signal f1. Moreover, the signal value y is applied to the carry input Cin of the adder circuit 106. This is necessary because the coefficient represented by the outputs of the inverter circuit 103, in fact, exhibits a deficiency of 1. Indeed, the coefficient (i+1) is not the complement of (N-1-i) but is equal to this complement plus 1. The adder circuit 106, the register 107 and the multiplex circuit 108 together form a summing circuit, which each time determines the sum of N consecutive signal values on the output of the OR gate circuit 105. The final result of the summing operation is loaded into a parallel-in parallel-out register 109 at a frequency of f1/N. The signal value on the outputs of the register 109 is the signal value v, representing the low-frequency information of the signal stream I. Since the signal values y are only 1-bit signal values the decimating filter can be very simple because AND gate circuits can be used for multiplication in order to determine the subproducts (i+1) y[n-i] and (n-1-i) y(n-i-N).

The decimating filter as shown in FIG. 10 has a second-order low-pass characteristic. It will be appreciated that it is also possible to use filters with a higher low-pass characteristic. Moreover, the decimating filter need not be of the integrate-and-dump type but it is alternatively possible to use decimating filters of different types.

FIG. 12 shows a circuit in which the filters 22a, 22b, 22c and 22d form part of a common circuit, the required computation the hardware being provided only once. In FIG. 12 elements corresponding to those in FIG. 10 bear the same reference numerals. Instead of the counter 100 a modified counter 101' is used whose counting range has been extended by 2 bits in comparison with the counter 100. Moreover, the clock signal f is applied to the count input of the counter 101' with a frequency of 4 times f1. The two least significant bits of the count are employed for controlling a four-channel multiplex circuit 120. The signal values ya, yb, yc and yd are applied to the inputs of the multiplex circuit 120 and are alternately transferred to the output of the multiplex circuit 120 under the influence of the control signals supplied by the counter 101'. Moreover, the circuit shown in FIG. 12 comprises a 4N-bit shift register 100' instead of the N-bit shift register 100. In addition, the registers 107 and 109 have been replaced by a pipeline of registers 107a, 107b, 107c and 107d and a pipeline of registers 109a, 109b, 109c and 109d. The circuit thus obtained computes the signal values va, bv, bd and vd in time multiplex, which has the advantage that the hardware required for computing the signal values va, vb, vc and vd can be reduced considerably.

By means of the signal values va, vb, vc and vd the computing circuit computes a sum signal value SS, a tracking-error signal value RE and a focus-error signal value FE in accordance with the following relationships:

$$SS = va + bv + vc + vd$$

$$RE = (va + bv) - (vc + vd)$$

$$FE = (va + vd) - (vb + vc).$$

The control signal values SR and SF are derived therefrom in a customary manner.

It will be evident that, in principle, it is also possible to obtain the signal values SS, RE and FE by linearly combining the signal values ua, ub, uc and ud and subsequently substracting the low-frequency component from the results of the linear combinations with the aid of quantising circuits and decimating filters. It is also possible to derive an additional tracking error signal RE*, having a larger bandwidth than the signal RE, from the signals ua, ub, uc and ud by first linearly combining ua, ub, uc and ud and subsequently removing signal components outside the desired larger bandwidth by means of a quantising circuit and a decimating filter. Such a "broad-band" tracking-error signal is very suitable for controlling a radial displacement of the read head 6 over larger distances.

FIG. 13 shows an example of the digital-to-analog converter 24, which is attractive because it requires a small amount of hardware. The digital-to-analog converter 24 shown comprises a clocked parallel-in parallel-out register 130 for receiving the signal values to be converted. The register 130 is clocked by means of a clock signal of the frequency f1/N. The output of the register 130 is applied to a summing circuit comprising an adder circuit 131 and a parallel-in parallel-out register 132, which is clocked by the clock signal of the frequency f. The overflow signal, which indicates that the result of the addition performed by the adder circuit 131 is out of range, is applied to an analog low-pass filter 133. The present digital-to-analog converter is of the "noise-shaping" type, n which a series of signal values of a low repetition frequency is converted into a series of signal values having a smaller number of bits and a higher repetition frequency such that the quantisation noise introduced by the reduction of the number of bits mainly comprises spectral components situated in the high-frequency part of the spectrum. These noise components are removed by the low-pass filter, after which a substantially noise-free analog signal is obtained.

The invention has been illustrated for an optical read apparatus having a read head in which the focus-error is detected in accordance with the "Foucault" method. It will be obvious that the invention can readily be applied to read apparatuses using other methods of focus-error detection, such as for example the astigmatic method, in which the beam reflected from the record carrier is directed towards a four-quadrant detector.

Further, it is to be noted that the embodiment shown herein is a single-beam optical read apparatus, in which the tracking-error signal is determined by push pull detection. However, the invention can also be used in 3-beam optical read apparatuses employing two additional radiation beam for determining the tracking-error signal, which beams are detected by means of two additional radiation-sensitive detectors. Two additional analog-to-digital converters are needed for converting the signal currents generated by means of these two additional detectors.

Moreover, the invention is not limited to optical read apparatuses but can also be applied to magnetic read apparatuses in which, in addition to the data signal, control signals for controlling the scanning process are derived from the low-frequency components of the detection signals.

I claim:

1. An apparatus for reading an information pattern in tracks on a record carrier, which apparatus comprises:
    a read head for scanning the record carrier tracks and deriving therefrom detection signals corresponding to the information pattern being scanned, the detection signals including control information for controlling the read head during scanning; and
    a signal-processing circuit for processing the detection signals, which circuit comprises at least one analog-to-digital converter for converting the detection signals into respective series of n-bit digital signal values of a specific repetition frequency, n being an integer greater than 1; said signal-processing circuit comprising:
    at least one quantizing circuit for converting the respective series of n-bit digital signal values into respective series of m-bit digital signal values, m being smaller than n; the quantizing circuit including a quantization-noise redistribution filter for quantization noise produced during said conversion of the n-bit signal values, said filter being adapted to concentrate spectral components of such quantization noise at the upper end of the quantization noise spectrum; and
    at least one decimating filter for converting the respective series of m-bit digital signal values into respective series of p-bit digital signal values, p being an integer larger than n, the repetition frequency of the p-bit digital signal values being lower than that of the n-bit digital signal values.

2. A read apparatus as claimed in claim 1, characterized in that the analog-to-digital converter comprises a sigma-delta modulator.

3. A read apparatus as claimed in claim 1 or 2, characterized in that $m=1$.

4. A read apparatus as claimed in claim 1 or 2, characterized in that the repetition frequency of said series of m-bit digital signal values is between two times and one time the bandwidth of the detection signals produced by the read head.

5. A read apparatus as claimed in claim 1 or 2, characterized in that the read head comprises: means for producing a radiation beam for scanning the record carrier tracks; at least one photo-detector for producing the detection signals; and an optical system for directing the radiation beam to the photo-detectors via the information pattern on the tracks.

6. A read apparatus as claimed in claim 5, characterized in that the record carrier is a compact disc and the information pattern in the tracks thereon represents an EFM modulated signal.

7. A read apparatus as claimed in claim 1, characterized in that the series of m-bit signal values produced by said quantizing circuit has a lower repetition frequency than said series of n-bit signal values produced by said analog-to-digital converter, and the series of p-bit signal values produced by said decimating filter has a lower repetition frequency than that of the series of m-bit signal values.

* * * * *